April 9, 1929.   J. SCHULMAN   1,708,804
AUTOMOBILE BUMPER
Filed Nov. 13, 1928
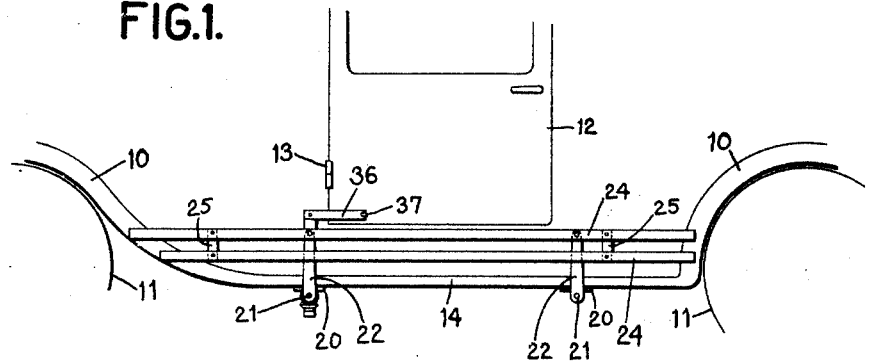
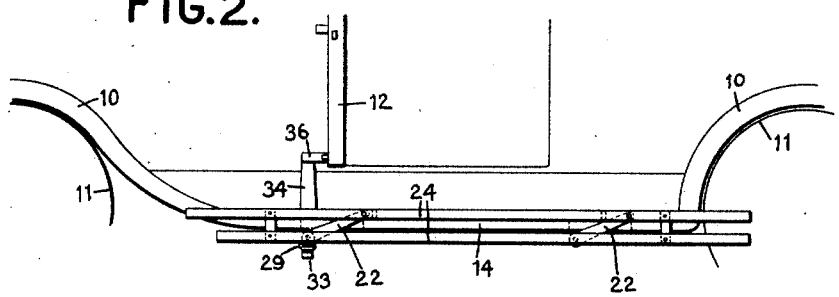
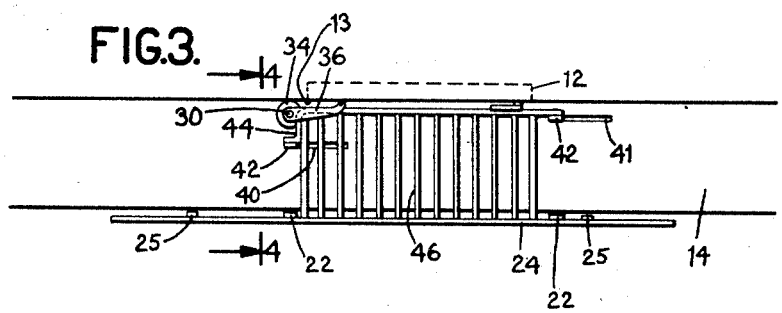
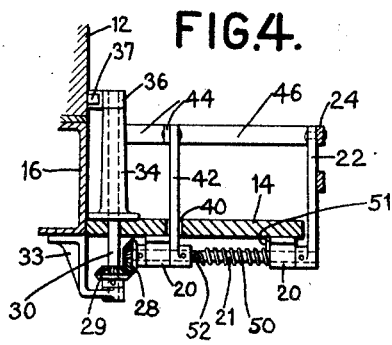
Inventor
JOSEPH SCHULMAN
By his Attorneys
Bohleber & Ledbetter Patented Apr. 9, 1929.

1,708,804

UNITED STATES PATENT OFFICE.

JOSEPH SCHULMAN, OF BROOKLYN, NEW YORK.

AUTOMOBILE BUMPER.

Application filed November 13, 1928. Serial No. 319,058.

This invention relates to bumpers for automobiles or other vehicles, and has for its principal object the provision of a bumper which shall protect the side of the vehicle from damage by collision.

The invention further seeks to protect the step or running board and fenders of a vehicle without, however, interfering with the entrance or exit from the vehicle. To this end the bumper is movable out of the way when the step is to be used to enter or leave the vehicle.

A further object of the invention is the provision of a bumper which is automatically movable. Accordingly, the bumper is adapted to be movable between extreme positions by the operation of the door. More particularly, the opening of a door serves to move the bumper out of the way, while, if desired, a spring may be provided to return the bumper to normal position when the door closes.

The invention also seeks a bumper of a rugged character which is capable of resisting shocks and impacts of great force. To this end, the bumper, in its normal position, may be reinforced by a frame work, and, if desired, this frame work may be so constructed as to take the place of the step or running board of the vehicle.

The invention also seeks a bumper which is practical from the standpoint of ease and cheapness of manufacture and convenience in use.

These and other objects of the invention and the means for their attainment will be more apparent from the following detailed description, taken in connection with the accompanying drawings, illustrating various modifications by which the invention may be realized, and in which:—

Figure 1 is a view in side elevation showing a bumper for the side of a vehicle in operative position to protect the running board and fenders.

Figure 2 is a view similar to Figure 1, but showing the door of the vehicle open and the bumper moved out of the way so that the step may be used to enter or leave the vehicle.

Figure 3 is a plan view showing a modified form of bumper provided with reinforcing or strengthening means.

Figure 4 is a transverse vertical section on the line 4—4 of Figure 3.

The drawings illustrate somewhat schematically, a bumper for use with motor vehicles, but it is to be understood that the invention is equally applicable in any situation in which the side of the vehicle is to be protected against impact. The bumpers are moved out of the way to permit the door to open and, in the preferred embodiment, the bumper moving mechanism is actuated by a door. A vehicle provided with only one door is illustrated but the invention is obviously applicable to a vehicle with a plurality of doors on each side. The fenders of a motor vehicle are shown at 10, the wheels in outline at 11 and a door 12 is hinged at 13. The step or running board 14 extends between the fenders 10.

Carried by the step 14 and preferably by means of spaced brackets 20, secured beneath the step, are spaced shafts 21 conveniently extending perpendicular to the longitudinal side frame members 16 of the chassis frame. The brackets 20 serve as bearings within which the shafts 21 turn. On the outer end of each shaft is carried an arm 22 extending normally in a generally vertical direction and carrying the bumper members proper. As illustrated, the bumper members comprise parallel bars 24, the lower bar being supported and connected to the upper bar by means of links 25 pivoted at their ends to the respective bars. The upper bar 24 is shown pivoted to the ends of the arms 22. It will thus be seen that when the shafts 21 are rotated, say in a clock-wise direction when looking at Figures 1 and 2, the bumper 24, 25 will be moved from the position shown in Figure 1, which is the normal protecting position for the bumper above the plane of the step 14 to the position shown in Figure 2, which is substantially in the plane of the step 14 and permits the step to be used in entering or leaving the vehicle. To effect this movement, one of the shafts 21 and preferably that nearest the door hinge 13, carries rigidly therewith a bevel gear 28 meshing with a bevel gear 29 carried upon a vertical shaft 30. The vertical shaft 30 is preferably journalled at its lower end in a bracket 33 conveniently supported from one of the longitudinal side frame members 16 of the vehicle, and also turns within a bearing member 34 mounted on the step 14. The upper end of the shaft terminates above the bottom of the door, but the shaft 30 is offset from the hinge line so as to permit the door to be opened and closed without obstruction. The upper end of the shaft 30 carries an arm 36 extending longitudinally of the body of the vehicle and carrying at its outer end a roller 37 adapted to be held against the door. To maintain the outer end of arms 36 always against the door any convenient resilient means may be used.

When the door 12 is opened, as shown in Figure 2, the arm 36 is caused to travel with the door, the roller 37 travelling over the outer surface of the door and the vertical shaft 30 is caused to turn in its bearings and with it, of course, the bevel gear 29. Rotation of the bevel gear 29 rotates the bevel gear 28 in a clock-wise direction, looking in the direction of Figures 1 and 2, and with it, of course, the shaft 21, and the rotation of the shaft 21 in a clock-wise direction causes the movement of the arm 22 also in a clock-wise direction, which movement is transmitted to the other arms 22 through the bumper members 24, and thus the opening of the door serves to move the bumper from the position shown in Figure 1 to the position shown in Figure 2, so as to provide an unobstructed entrance or exit from the vehicle. When the door is again closed, the bumper members are returned to the position shown in Figure 1 through the instrumentality of a spring 50 encircling one or more of the shafts 21. One end of this spring, as at 51, is secured to the step 14 or is otherwise retained against displacement with respect thereto. The other end of the spring is secured, as at 52, to the shaft 21. Thus, when the door is opened and the shaft turned in a clock-wise direction, the spring is twisted, and the energy thus stored therein is utilized to return the bumper to upper position when the door is closed.

In the modification shown in Figures 3 and 4, the bumper is reinforced or strengthened by a supplemental frame work or grid now to be described. In this modification, the step 14 is formed with slots 40. Through the slots pass arms 42 (Figure 4) rigidly carried by the shafts 21 and between these arms 42 extends a rear frame member 44. Between the rear frame member 44 and the bumper bar 24, there may extend a plurality of ribs 46 forming a grid, which, when the fender is moved down to the out-of-the-way position shown in Figure 2 may serve as a surface upon which to step when entering or leaving the vehicle. Obviously, this grid 46 may take the place of the step 14, which can be omitted and the grid 46 used as the step.

It will thus be seen that a bumper is provided which may be normally disposed in a position where it will afford complete protection of the fenders and sides of a vehicle, but which is automatically movable out of the way when a door is opened to permit the unobstructed passage of a person entering or leaving the vehicle. In one modification, the bumper may serve as the step, thus simplifying the structure and reducing to that extent the weight of the vehicle.

Various modifications will occur to those skilled in the art in the position and disposition of the component elements going to make up this invention as a whole, and no limitation is intended by the phraseology of the foregoing specification or illustrations in the accompanying drawings, except as indicated in the appended claims.

What I claim is:

1. The combination with a vehicle of a bumper disposed along the side thereof, and means to move said bumper out of the way to permit egress from the vehicle.

2. The combination with a vehicle having a door, a movable bumper disposed along the side of the vehicle, and means to move the bumper by movement of the door.

3. In an automobile in combination, a door, a step, a bumper carried by the step, and means operable to move the bumper by movement of the door.

4. In an automobile having a door and a step, in combination, a shaft rotatably carried by the step, an arm carried by the shaft, a bumper moved by the arm and means to rotate the shaft operable by movement of the door.

5. In an automobile having a door and a step, a shaft rotatably carried by the step, an arm carried by the shaft, a bumper carried by the arm, a shaft perpendicular to the first named shaft, operable connections between the shafts, an arm carried by the second named shaft and adapted to be engaged by the door.

6. In an automobile having a door and a step, a shaft rotatably carried by the step, an arm carried by the shaft, a bumper moved by the arm, a shaft perpendicular to the first named shaft, operable connections between the shafts, an arm carried by the second named shaft and adapted to be engaged by the door to rotate the second shaft when the door is opened and resilient means to return the shaft to initial position when the door is closed.

In testimony whereof I affix my signature.

JOSEPH SCHULMAN.